June 29, 1943.        B. W. CARRINGTON        2,323,008
COUPLING AND CONTROLLING DEVICE
Filed Nov. 29, 1941

INVENTOR.
BY Blake W. Carrington
Manker M. Slough
His ATTORNEY

Patented June 29, 1943

2,323,008

UNITED STATES PATENT OFFICE 2,323,008

COUPLING AND CONTROLLING DEVICE

Blake W. Carrington, Elyria, Ohio, assignor to The General Industries Company, Elyria, Ohio, a corporation of Ohio Application November 29, 1941, Serial No. 421,027

5 Claims. (Cl. 192—104)

My invention relates to a coupling and controlling device adapted to be inserted in the power transmission from a driving motor to a driven part and relates more particularly to a coupling and controlling device adapted to be inserted in the power transmission from a phonograph turntable motor to the turntable.

An object of my invention is to provide a coupling and controlling device of the type described between the motor shaft and the driven shaft of the driving mechanism by means of which the speed of the last mentioned shaft is automatically maintained as constant as possible.

Another object of my invention is to provide such coupling and controlling device inserted in the transmission from the electric motor to the record as will be highly efficient in use and particularly adapted for use in the motor transmission where the source of power for the motor is provided by small batteries.

A further object of my invention is to provide a coupling and controlling device for the purposes mentioned which will fulfill its purpose without loss of power.

Other objects of my invention and the invention itself will become more apparent from a purview of the following description wherein reference is had to the accompanying drawing, in which.

Figure 1:
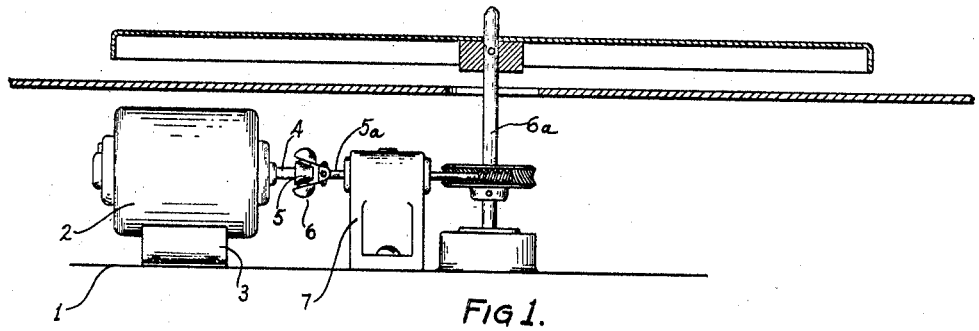
Fig. 1 is a side elevational view of the phonograph turntable of my invention showing my improved coupling and controlling device inserted in the power transmission between the motor and the driven shaft.

Referring to the drawing, at 1 I show the main frame support or base of the housing for the improved phonograph of my invention. At 2 I show an electric motor of the usual type adapted to be driven by current from small batteries (not shown), said motor being mounted upon a support 3 which is secured to the frame or base 1. At 4 I show the motor shaft which is formed with a conical end piece 5 which is adapted to contact the coupling and controlling device of my invention which is generally illustrated at 6, said device being secured to a shaft 5a which shaft is adapted to be geared in the usual manner to a turntable shaft 6a which projects upwardly through a central perforation in the turntable to which it is secured.

A further support member 7 may be provided in which the shaft 5a may be journalled and adapted for movement longitudinally and axially with respect thereto, although the manner of this support or the disposition of any such support is immaterial and constitutes no essential part of my invention.

The coupling and controlling device of my invention as generally illustrated at 6 comprises a flexible band of spring steel 8 having a pair of elongated perforations 9 disposed at either end thereof and a cylindrical perforation 10 disposed centrally thereof. A pair of semi-cylindrical, preferably brass, weights 11 and 12 are secured to the opposite ends of said flexible band 8 by means of pins or rivets and the inner faces of said bands are provided at a position intermediate the ends of the outwardly disposed weights with strips of felt or like material 13 and 14 which are adapted to contact the outer surfaces of said conical end portion of said shaft 4.

Figures 2, 3:
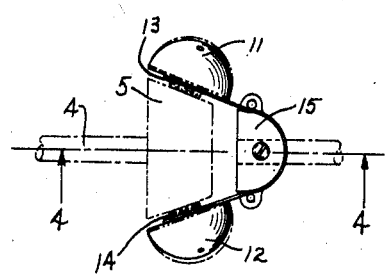
Fig. 2 is an enlarged view of the said coupling and controlling device of Fig. 1.
Fig. 3 is an end view of the coupling and controlling device of Fig. 2.
Figures 4, 5:
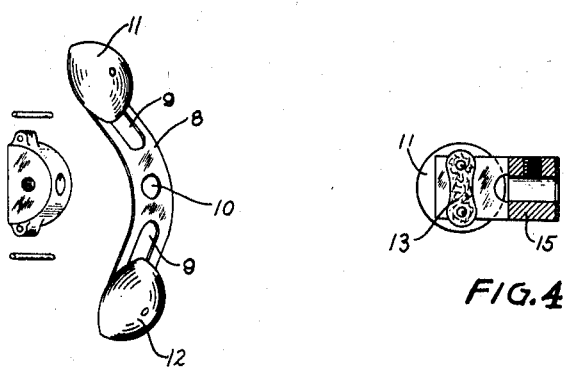
Fig. 4 is a view taken from the line 4—4 of Fig. 2.
Fig. 5 is an exploded view showing the several parts which are secured together to form the coupling and controlling device of Figs. 1 to 4 inclusive.

A semi-cylindrical yoke portion 15, preferably formed of brass, is secured to the intermediate portion of said flexible band 8 whereby the legs of said band are projected outwardly to spaced telescoped relation with said conical end 5 of the shaft 4 and said yoke member is centrally bored whereby it is secured to the shaft 5a, spaced from the end of the shaft 4 as clearly illustrated in Fig. 2.

As clearly shown the felt strips 13 and 14 contact the opposite side faces of the conical end portion 5 when the motor is inoperative and also when the turntable is driven at slow speed. It will be understood however that when the shaft 5a is driven at high speed due to rapid rotary movement of the turntable, which speed is communicated to the shaft 5a by the turntable shaft 6a by means of the gearing shown in Fig. 1, the weights 11 and 12 swing outwardly to provide slippage between the weights and the motor rotor 4 and that when the turntable is driven at lesser speed frictional contact is had between the felt surfaces of said coupling and controlling device and the conical end portions of the shaft 4.

Hence it will be seen that the speed of the turntable shaft will be held virtually constant due to the operation of the coupling device and that the same is effected in a highly efficient manner by a simple and economical structure.

I am aware that numerous and extensive departures may be made from the embodiments herein illustrated and described such as changes in materials and forms without however departing from the spirit of my invention and the scope of the appended claims.

I claim:

1. In a phonograph driving mechanism, a driven shaft associated with the turntable, a driving shaft associated with the power source, said driving shaft being spaced from said driven shaft, means for controlling the speed of the said driven shaft carried by said driven shaft, said means comprising a flexible arc portion, a pair of depending legs, a pair of weights affixed to the ends of said legs, said weights having means associated therewith engaged by the driving shaft when the driving mechanism is driven at slow speeds and swinging outwardly out of contact with said driving shaft when said mechanism is driven at high speed.

2. In a phonograph driving mechanism, a driven shaft associated with the turntable, a driving shaft associated with the power source, said driving shaft being spaced from said driven shaft and being provided with a conical end portion, means for controlling the speed of the said driven shaft carried by said driven shaft, said means comprising a flexible arc portion, a pair of depending legs, a pair of weights affixed to the ends of said legs, said weights having means associated therewith engaged by the conical end portion of the driving shaft when the driving mechanism is driven at slow speeds and swinging outwardly out of contact with said conical driving shaft when said mechanism is driven at high speed.

3. In a phonograph driving mechanism, a driven shaft associated with the turntable, a driving shaft associated with the power source, said driving shaft being spaced from said driven shaft and being provided with a conical end portion, means for controlling the speed of the said driven shaft carried by said driven shaft, said means comprising a flexible band of spring steel, a pair of elongated perforations disposed at either end of said band, a pair of weights secured to the opposite ends of said flexible band, a semi-cylindrical yoke portion secured to an intermediate portion of said flexible band by means of securing means carried thereby and projected through said perforations whereby the legs of said band are projected outwardly in spaced telescoped relation with the conical end portion of said driving shaft, said weights having means associated therewith engaged by the conical end portion of the driving shaft when the driving mechanism is driven at slow speeds and swinging outwardly out of contact with said conical driving shaft when said mechanism is driven at high speed.

4. In a phonograph drivng mechanism, a driven shaft associated with the turntable, a driving shaft associated with the power source, said driving shaft being spaced from said driven shaft and being provided with a conical end portion, means for controlling the speed of the said driven shaft carried by said driven shaft, said means comprising a flexible band of spring steel, a pair of elongated perforations disposed at either end of said band, a pair of weights secured to the opposite ends of said flexible band, a semi-cylindrical yoke portion, securing means carried thereby projected through said perforations above, a pair of felt washers disposed on the inner face of the opposite ends of said band, said washers being engaged by the conical end portion of the driving shaft when the driving mechanism is driven at slow speeds and swinging outwardly out of contact with said conical driving shaft when said mechanism is driven at high speed, the felt washers being adapted to contact the outer surfaces of the conical end portion of the driving shaft when the driving mechanism is driven at said slow speed.

5. In a phonograph mechanism, a driven shaft associated with the turntable, a driving shaft associated with the power source, said driving shaft being provided with a conical end portion, means for controlling the speed of the said driven shaft carried by said driven shaft, said means comprising a flexible band, a plurality of weights secured thereto, a pair of said weights being secured at either end of said flexible band and a weight secured to the center portion of said band, said last named weight and said associated band being rigidly secured to said driven shaft, friction contactors on the inner face of the opposite ends of said band, said contactors being engaged by the conical end portion of the driving shaft when the driving mechanism is driven at a predetermined speed.

BLAKE W. CARRINGTON.